United States Patent
Kolberg

(10) Patent No.: US 7,437,231 B2
(45) Date of Patent: Oct. 14, 2008

(54) BRAKE SYSTEM PROVIDING AT LEAST ONE ENABLE SIGNAL TO BRAKE CONTROLLERS AND METHOD OF USING SAME

(75) Inventor: David A. Kolberg, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 119 days.

(21) Appl. No.: 11/057,573

(22) Filed: Feb. 14, 2005

(65) Prior Publication Data

US 2006/0184306 A1 Aug. 17, 2006

(51) Int. Cl.
*B60T 7/12* (2006.01)

(52) U.S. Cl. ............... 701/70; 188/1.11 E; 303/124; 340/453

(58) Field of Classification Search ............... 701/70, 701/71, 76, 78; 303/20, 963, 2, 3, 122, 124; 188/156, 16, 264 R, 1.11 E; 244/111; 340/453; 73/121

See application file for complete search history.

(56) References Cited

U.S. PATENT DOCUMENTS

| | | | |
|---|---|---|---|
| 5,777,218 A | | 7/1998 | Salamat et al. |
| 6,134,956 A | | 10/2000 | Salamat et al. |
| 6,183,051 B1 | | 2/2001 | Hill et al. |
| 6,296,325 B1 | | 10/2001 | Corio et al. |
| 6,398,162 B1 * | | 6/2002 | Stimson et al. ............ 244/111 |
| 6,402,259 B2 * | | 6/2002 | Corio et al. ............ 303/20 |
| 6,478,252 B1 * | | 11/2002 | Stimson et al. ............ 244/111 |
| 6,910,747 B2 * | | 6/2005 | Tsunehara ............ 303/152 |
| 6,954,692 B2 * | | 10/2005 | Dellac et al. ............ 701/70 |
| 7,373,224 B2 * | | 5/2008 | Goetz et al. ............ 701/29 |
| 2001/0027367 A1 * | | 10/2001 | Maruko et al. ............ 701/70 |
| 2002/0133284 A1 * | | 9/2002 | Manaka et al. ............ 701/70 |
| 2003/0125863 A1 * | | 7/2003 | Tamasho et al. ............ 701/70 |
| 2003/0182044 A1 * | | 9/2003 | Nakamura et al. ............ 701/70 |
| 2003/0233179 A1 * | | 12/2003 | Matsubara et al. ............ 701/36 |
| 2004/0015283 A1 * | | 1/2004 | Eckert et al. ............ 701/70 |
| 2004/0024513 A1 * | | 2/2004 | Aizawa et al. ............ 701/70 |
| 2004/0239173 A1 | | 12/2004 | Williams et al. |
| 2005/0012385 A1 | | 1/2005 | Sibre |

* cited by examiner

*Primary Examiner*—Tuan C To
(74) *Attorney, Agent, or Firm*—Birch, Stewart, Kolasch & Birch, LLP

(57) ABSTRACT

A braking system includes a brake control system (BCS) (26) having a first output (30) and a second output (32), a first controller (34) having a brake command input (38) connected to the BCS first output (30), a direct enable input (36), an indirect enable input (44), a driver output (40) and an indirect enable output (42), a second controller (50) having a brake command input (54) connected to the BCS second output (32), a direct enable input (52), an indirect enable input (60), a driver output (56) and an indirect enable output (58). The first controller (34) produces an indirect enable signal on the first controller indirect enable output (42) when a direct enable signal is received at the first controller direct enable input (36) and a brake command signal is received at the brake command input (54), and produces a driver actuation signal on the first controller driver output (40) when a direct enable signal is present on the first controller direct enable input (52) and an indirect enable signal is present on the first controller indirect enable input (44) and a brake command is received on the first controller brake command input (38).

8 Claims, 4 Drawing Sheets

BRAKE SYSTEM PROVIDING AT LEAST ONE ENABLE SIGNAL TO BRAKE CONTROLLERS AND METHOD OF USING SAME

FIELD OF THE INVENTION

The present invention is directed to a brake system that uses redundant control signals and a method of controlling same, and, more specifically, toward a brake system that provides at least one enable signal to a brake controller to establish when braking is authorized and a method of using such a system.

BACKGROUND OF THE INVENTION

Aircraft brake systems can generally carry out both commanded and uncommanded braking. Commanded braking occurs when a pilot depresses a brake pedal or in some other manner produces a signal to initiate braking. Uncommanded braking occurs when an aircraft computer or aircraft brake control system (BCS) actuates an aircraft's brakes without pilot input. Uncommanded braking is used, for example, to test an aircraft's brakes prior to landing to ensure they are in working order. Uncommanded braking may also occur immediately after take off to stop the landing gear wheels from rotating before the landing gear is retracted.

Because uncommanded braking is controlled by a computer, there is a possibility that it will occur as the result of a software bug or malfunction. Such uncommanded braking during takeoff could be disastrous, and thus braking systems must be designed so that uncommanded braking at critical times such as takeoff is extremely improbable.

This can be accomplished by using extremely reliable software, satisfying DO178B level A standards of no more than a one-in-one-billion failure rate, for example. However, testing and maintaining software to this level of reliability is difficult and very expensive. It is preferable to use software satisfying the lower DO178B level B standard of reliability, or having no more than a one-in-one-million failure rate. Therefore, to achieve an acceptably high level of reliability using such software, a redundant brake control path has heretofore been used. This may comprise, for example, a hard-wired circuit between a brake pedal and a brake driver (a device that controls either the electromechanical actuator of an electric brake or the hydraulic controls of a hydraulic brake). Unless a signal is present on this circuit during critical times such as takeoff (e.g. when weight is sensed on the aircraft wheels), to indicate commanded braking, a computer command to actuate the aircraft brakes will be ignored.

This solution provides adequate results. However, wiring for the redundant circuit has to be run from brake pedals in the cockpit to a driver in or near the aircraft wheel well. This increases the weight and cost of the brake system and adds maintenance costs as well. It would therefore be desirable to provide a braking system for an aircraft that is controlled by software in a manner that makes uncommanded braking during takeoff extremely improbable but which does so without the use of DO178B level A software.

SUMMARY OF THE INVENTION

These difficulties and others are addressed by the present invention, which comprises, in a first embodiment, a braking system that includes a brake control system (BCS) having a first output and a second output. A first controller includes a brake command input connected to the BCS first output, a direct enable input, an indirect enable input, a driver output and an indirect enable output. A second controller has a brake command input connected to the BCS second output, a direct enable input, an indirect enable input, a driver output and an indirect enable output. The first controller produces an indirect enable signal on the first controller indirect enable output when a direct enable signal is received at the first controller direct enable input and a brake command signal is received at the brake command input. The first controller produces a driver actuation signal on the first controller driver output when a direct enable signal is present on the first controller direct enable input and an indirect enable signal is present on the first controller indirect enable input and a brake command is received on the first controller brake command input.

Another aspect of the invention comprises an aircraft braking system that includes a bus, a main control computer connected to the bus and a brake control system (BCS) connected to the bus and having a first output and a second output. A first controller is provided having a brake command input connected to the BCS first output, and also having a direct enable input operatively connected to the bus and a driver output. A second controller is provided having a brake command input connected to the BCS second output and also having a direct enable input operatively connected to the bus and a driver output. The first controller produces a driver actuation signal on the first controller driver output when a direct enable signal is present on the first controller direct enable input and a brake command is received on the first controller brake command input.

Another aspect of the invention comprises a method of preventing uncommanded aircraft braking when an aircraft is on the ground that includes the steps of providing a software module for producing a direct enable signal on a bus when braking is authorized, and connecting a first controller, a second controller and a brake control system (BCS) to the bus. The first controller and second controller are connected to the BCS, and a first driver is connected to the first controller and second driver is connected to the second controller. The first controller is connected to the second controller. An indirect enable signal is sent from the first controller to the second controller when the first controller receives a direct enable signal from the bus and a brake command from the BCS. A control signal is sent to the first driver when the first controller receives a direct enable signal from the bus and an indirect enable signal from the second controller and a brake command from the BCS.

BRIEF DESCRIPTION OF THE DRAWINGS

These and other aspects of the invention will be better understood after a reading of the detailed description that appears below together with the following drawings wherein.

DETAILED DESCRIPTION

Figure 1:
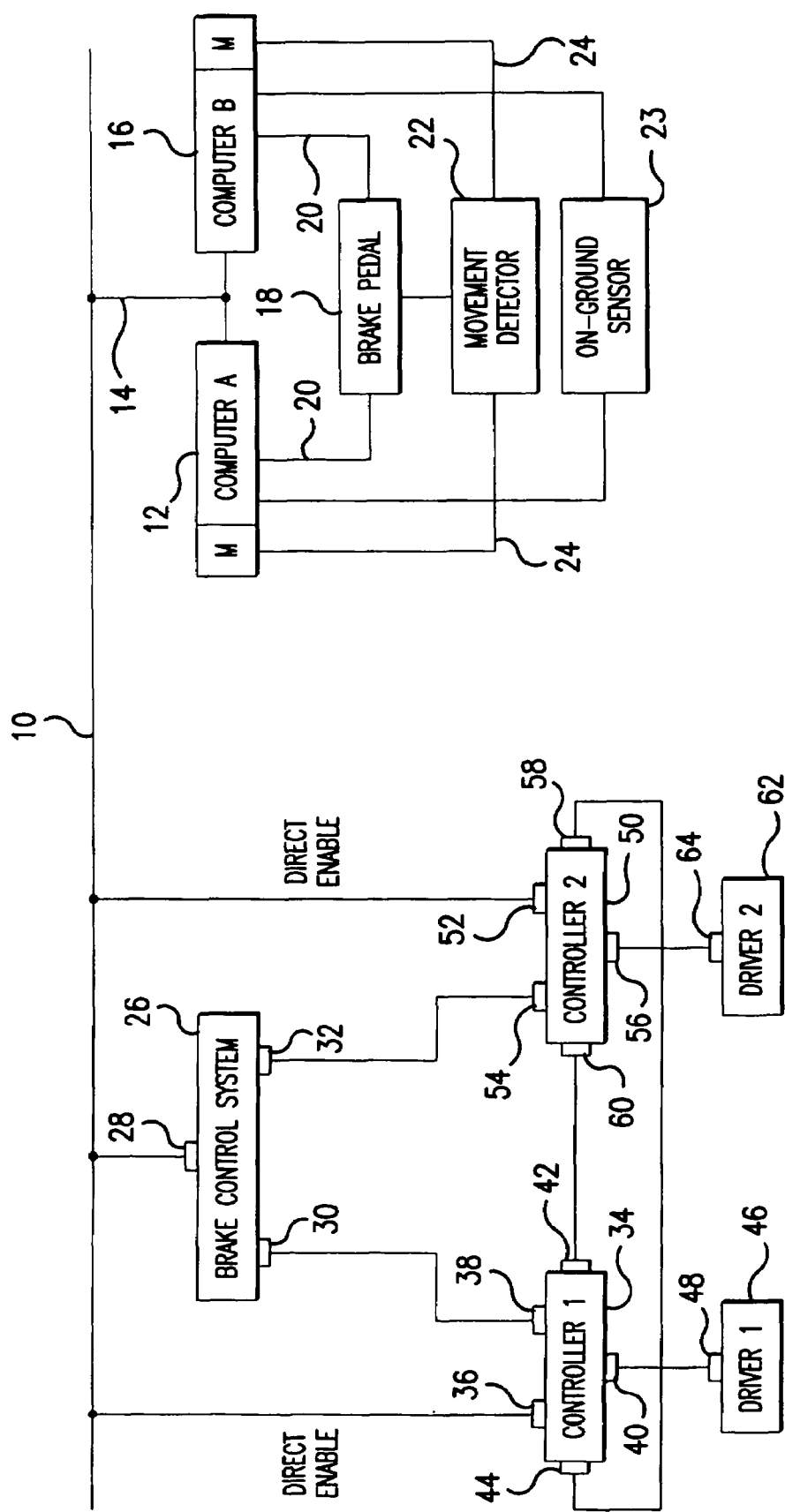
FIG. 1 illustrates a brake control system according to a first embodiment of the invention.

Referring now to the drawings, wherein the showings are for purposes of illustrating preferred embodiments of the invention only and not for the purpose of limiting same, FIG. 1 illustrates a braking system that includes a bus 10 and a first computer 12 connected to bus 10 by a line 14 and a second, redundant computer 16 connected to bus 10 by line 14. Each of the first and second computers 12, 16, which may constitute the main cockpit control computers of an aircraft, for example, run a software module M which senses the position of a brake pedal brake pedal 18. Brake pedal 18 is connected to first and second computers 12, 16 by first lines 20 that carry braking signals to computers 12, 16. Brake pedal 18 is also connected to a movement detector 22 which sends a signal over second lines 24 to the software modules M of first and second computers 12, 16 each time movement of brake pedal 18 is detected. An on-ground sensor 23, such as a sensor for determining when the weight of an aircraft is on the aircraft's landing gear, is also connected to first and second computers 12, 16 to provide additional information for determining when uncommanded braking is allowed.

When software modules M receive a signal on second lines 24 indicating movement of brake pedal 18, modules M cause computers 12, 16 to send a direct enable signal onto bus 10 via line 14. Computers 12, 16 also send braking commands to bus 10 based on the strength of the signals received from brake pedal 18. Computers 12, 16 can also send braking commands when no signal is received from pedal 18; these uncommanded braking signals may be generated, for example, prior to landing as part of a braking diagnostic check to confirm that the brakes (not shown) are operating properly.

The braking system of an embodiment of the present invention also includes a brake control system (BCS) 26, which generally is or includes a processor (not shown) and is responsible for control and sensing functions in connection with the various drivers and sensors on the one or more brakes controlled by the BCS 26. BCS 26 includes an input 28 operatively connected to bus 10, a first output 30 and a second output 32. The braking system further includes a first controller 34 having a direct enable input 36, a brake command input 38, a driver output 40, an indirect enable output 42 and an indirect enable input 44. First output 30 of BCS 26 is connected to brake command input 38 of first controller 34, while direct enable input 36 of first controller 34 is connected to bus 10. A first driver 46 having an input 48 is connected to driver output 40 of first controller 34.

The braking system further includes a second controller 50 having a direct enable input 52, a brake command input 54, a driver output 56, an indirect enable output 58 and an indirect enable input 60. Second output 32 of BCS 26 is connected to brake command input 54 of second controller 50, while direct enable input 52 of second controller 50 is connected to bus 10. A second driver 62 having an input 64 is connected to driver output 56 of second controller 50. First driver 46 and second driver 62 are connected to one or more braking mechanisms (not shown), such as the electromagnetic actuator of an electric brake or the hydraulic actuator of a hydraulic brake. The use of first and second drivers 46, 62 to control the braking of an aircraft wheel is well known and will not be discussed further. Indirect enable output 42 of first controller 1 is connected to indirect enable input 60 of second controller 50, while indirect enable output 58 of second controller 50 is connected to indirect enable input 44 of first controller 34.

As previously mentioned, first and second computers 12, 16 output direct enable signals on bus 10 when motion detectors 22 indicate that brake pedal 18 has moved and first and second computers 12, 16 send braking signals on bus 10 when braking, either commanded or uncommanded, is required. Braking signals are received by brake control system 26 at BCS input 28, and BCS 26 outputs appropriate signals to brake command input 38 of first controller 34 and brake command input 54 of second controller 50 which signals, if received at first driver 46 and second driver 62 will cause the first and second drivers 46, 62 to actuate brakes (not shown) in a desired manner. However, as discussed below, brake commands received at the brake command inputs 38, 54 of first and second controllers 34, 50 are not always passed to the first and second drivers 46, 62.

First controller 34 is configured to produce an output signal on indirect enable output 42 when it receives both a brake command on brake command input 38 and a direct enable signal on direct enable input 36 from bus 10. In the present embodiment, indirect enable output 42 of first controller 34 is connected to indirect enable input 60 of second controller 50. Furthermore, first controller 34 is configured to produce an output at driver output 40 only after receiving a direct enable signal at direct enable input 36, a brake command at brake command input 38 and an indirect enable signal at indirect enable input 44. Second controller 50 is configured in a similar manner and therefore only sends an indirect enable signal to first controller 34 when an enable signal is received at second controller direct enable input 52 and a brake command is received at second controller brake command input 54. Therefore, first driver 42 is only actuated if five signals are present: signals must be present at both direct enable input 36 of first controller 34 and direct enable input 52 of second controller 50, brake commands must be received at first controller brake command input 38 and second controller brake command input 54, and an indirect enable signal must be present at first controller indirect enable input 44. Second controller 50 is configured in a similar manner and thus must receive an indirect enable signal at indirect enable input 60 from indirect enable output 42 of first controller 34 before passing a braking command to second driver 62.

Thus, if first computer 12 sends a braking command to bus 10 when software module M is not generating an enable signal, no braking will occur. Likewise, an erroneously generated brake enable signal generated by one of software modules M will not itself actuate first and second drivers 46, 62.

The above described braking system uses two separate software controls each having a first reliability, level B reliability of, for example, one error in one million operations, to achieve a reliability greater than software of a more reliable type, such as level A software having a reliability of one error in one billion operations. Since errors would have to occur simultaneously in two software systems, the likelihood of uncommanded braking during a time when uncommanded braking is not permitted drops to approximately one in one trillion.

The brake system of FIG. 1 can also be operated in a mode wherein the indirect enable inputs and indirect enable outputs discussed above are not used. Thus, for example, first controller 34 produces a driver output signal at driver output 40 when a direct enable signal is received at direct enable input 36 and a braking command is received at braking command input 38. Under this arrangement, the above described software error rate remains valid, but it is possible that an internal fault in first controller 34 could actuate first driver 46. The use of indirect enable signals as described above helps to protect against controller errors in addition to software errors.

Figure 2:
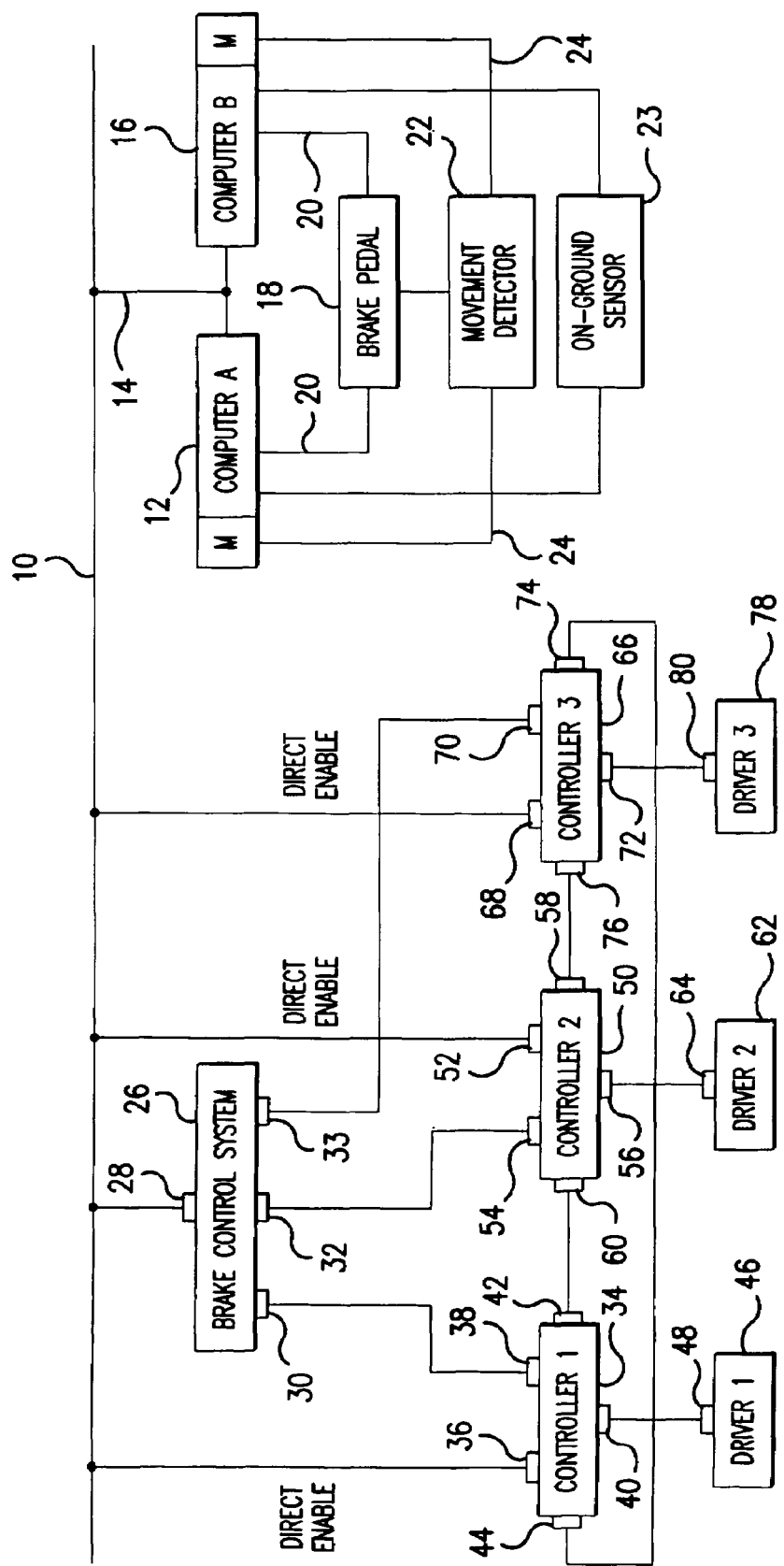
FIG. 2 illustrate a brake control system according to a second embodiment of the invention.

A second embodiment of the present invention is illustrated in FIG. 2 wherein elements common to the first embodiment are identified with identical reference numerals. In the second embodiment, BCS 26 includes a third output 33. This embodiment further includes a third controller 66 having a direct enable input 68, a brake command input 70, a driver output 72, an indirect enable output 74 and an indirect enable input 76. Third output 33 of BCS 26 is connected to brake command input 70 of third controller 66, while direct enable input 68 of third controller 66 is connected to bus 10. A third driver 78 having an input 80 is connected to driver output 72 of third controller 66. Third controller 66 is configured to operate in the same manner as first and second controllers 34, 50 described above, that is, to output an indirect enable signal on indirect enable output 74 when receiving both a signal on direct enable input 68 and a brake command on brake command input 70 and to generate a signal on driver output 72 when a signal is also present on indirect enable input 76.

Indirect enable output of 42 of first controller 34 is connected to indirect enable input of second controller 50, indirect enable output 58 of second controller 50 is connected to indirect enable input 76 of third controller 66, and indirect enable output 74 of third controller 66 is connected to indirect enable input 44 of first controller 34. In this embodiment, therefore, each of the first, second and third controllers 34, 50, 66 requires input from one additional controller before actuating its associated driver. From this description, it can be seen that the number of controllers can readily be increased to more than three.

Figure 3:
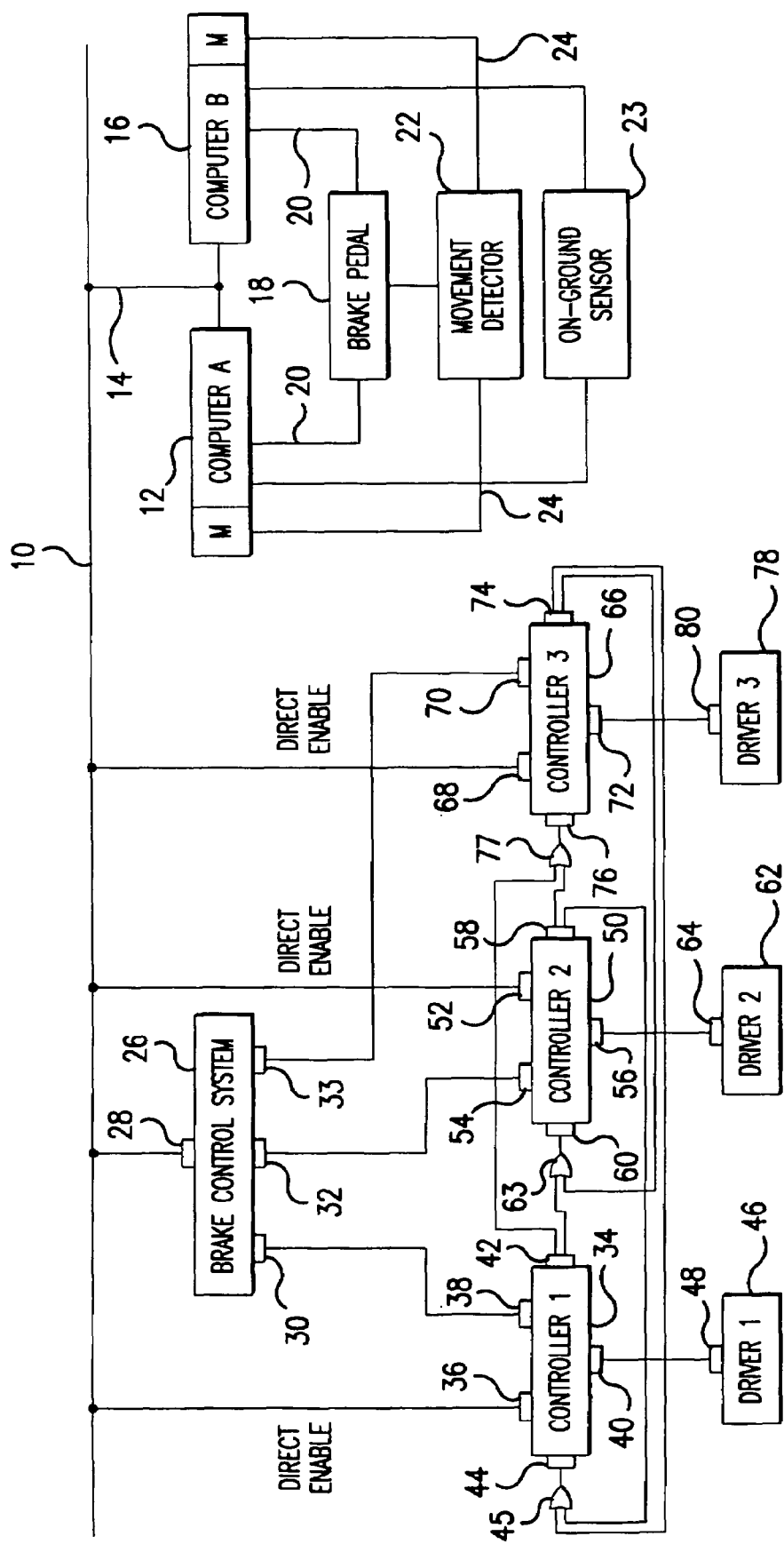
FIG. 3 illustrate a brake control system according to a third embodiment of the invention.

A third embodiment of the present invention is illustrated in FIG. 3 wherein the same reference numerals used to identify elements common to the previous embodiments. The third embodiment includes first, second and third controllers 34, 50, 66 as in the previous embodiment, but the indirect enable inputs and outputs are wired differently. Specifically, the output of a first OR gate 45 is connected to the indirect enable input 44 of first controller 34, the output of a second OR gate 63 is connected to the indirect enable input of second controller 50, and the output of a third OR gate 77 is connected to the indirect enable input of third controller 66. Thus at least one of two signals, in this case from the indirect enable outputs 58, 74 of second and third controllers 50, 66, must be received at first OR gate 45 before a signal will be produced at the indirect enable input 44 of first controller 34. Similarly, at least one of two signals, from indirect enable outputs 74, 42 of third and first controllers 66, 34 must be received at second OR gate 63 before indirect enable input 62 of second controller 50 will receive an indirect enable signal, and at least one of two signals must be received at third OR gate 77 from indirect enable output 42 of first controller 34 and indirect enable output 58 of second controller 50, before third controller 50 will receive an indirect enable signal. To this end, indirect enable output 42 of first controller 34 is connected to the indirect enable input of second controller 50 and to the indirect enable input of third controller 66; the indirect enable output 58 of second controller 50 is connected to the indirect enable input 76 of third controller 66 and to the indirect enable input 44 of first controller 34; and the indirect enable output 74 of third controller 66 is connected to the indirect enable input 44 of first controller 34 and to the indirect enable input 60 of second controller 50. This arrangement provides an additional degree of assurance against uncommanded braking because at least two controllers must agree that braking is warranted before activating their associated drivers. The braking system of this arrangement can also be scaled and used with a greater number of controllers. Moreover, the number of indirect enable inputs required for a controller to send a signal to its associated driver can vary independently of the number of controllers. For example, a system having five controllers could require one, two, three, or four indirect enable inputs before actuating a driver. Finally, the first, second and third OR gates 45, 63, 77, could be replaced with AND gates if complete agreement among the controllers was desired before braking was allowed. A combination of AND and OR gates can be provided depending on the level of reliability desired.

Figure 4:
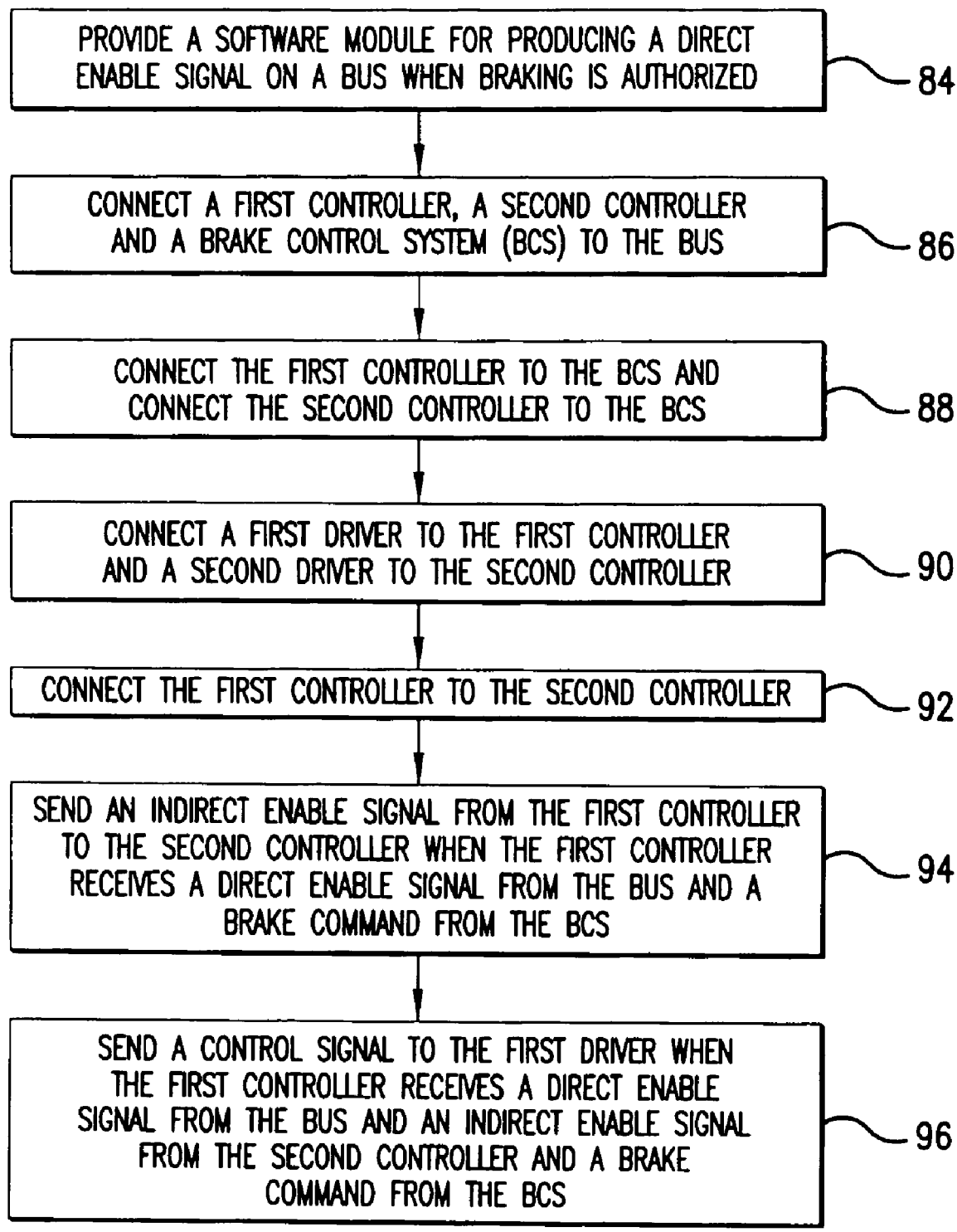
FIG. 4 is a flow chart illustrating a method of operating a brake control system according to an embodiment of the present invention.

A method of operating a braking system according to an embodiment of the present invention is illustrated in FIG. 4. This method include providing a software module for producing a direct enable signal on a bus when braking is authorized at a step 84, connecting a first controller, a second controller and a brake control system to the bus at a step 86, connecting the first controller to the BCS and connecting the second controller to the BCS at a step 88, connecting a first driver to the first controller and a second driver to the second controller at a step 90, connecting the first controller to the second controller at a step 92, sending an indirect enable signal from the first controller to the second controller when the first controller receives a direct enable signal from the bus and a brake command from the BCS at a step 94, and sending a control signal to the first driver when the first controller receives a direct enable signal from the bus and an indirect enable signal from the second controller and a brake command from the BCS at a step 96.

The present invention has been described herein in terms of several preferred embodiments. However obvious modifications and additions to these embodiments will become apparent to those skilled in the relevant arts upon a reading of the foregoing description. It is intended that all such obvious modifications and additions form a part of the present invention to the extent they fall within the scope of the several claims appended hereto.

What is claimed is:

1. A braking system comprising:
a brake control system (BCS) having a first output and a second output;
a first controller having a brake command input connected to said BCS first output, a direct enable input, an indirect enable input, a driver output and an indirect enable output;
a second controller having a brake command input connected to said BCS second output, a direct enable input, an indirect enable input connected to said first controller indirect enable output, a driver output and an indirect enable output;
said first controller producing an indirect enable signal on said first controller indirect enable output when a direct enable signal is received at said first controller direct enable input and a brake command signal is received at said brake command input and producing a driver actuation signal on said first controller driver output when a direct enable signal is present on said first controller direct enable input and an indirect enable signal is present on said first controller indirect enable input and a brake command is received on said first controller brake command input, wherein said BCS includes a third output and including a third controller having a brake command input connected to the BCS third output, a direct enable input, an indirect enable input, a driver output and an indirect enable output connected to said first controller indirect enable input.

2. The braking system of claim 1 including a software module for sending an enable signal to said first controller direct enable input and said second controller direct enable input when said BCS is authorized to command braking.

3. The braking system of claim 1 including a software module for sending an enable signal to said first controller direct enable input and said second controller direct enable input when movement of a brake pedal is detected.

4. The braking system of claim 1 including a bus connected to a control computer, a first direct enable line connecting said bus and said first controller direct enable input, a second direct enable line connecting said bus and said second controller direct enable input, and a third line connecting said bus to said BCS.

5. The braking system of claim 1 wherein said second controller indirect enable output is connected to said third controller indirect enable input.

6. A braking system comprising:
   a brake control system (BCS) having a first output and a second output;
   a first controller having a brake command input connected to said BCS first output, a direct enable input, an indirect enable input, a driver output and an indirect enable output;
   a second controller having a brake command input connected to said BCS second output, a direct enable input, an indirect enable input, a driver output and an indirect enable output;
   said first controller sending an indirect enable signal to said second controller when a direct enable signal is received at said first controller direct enable input and a brake command signal is received at said brake command input and producing a driver actuation signal on said first controller driver output when a direct enable signal is present on said first controller direct enable input and an indirect enable signal is present on said first controller indirect enable input and a brake command is received on said first controller brake command input; wherein said first controller indirect enable output is operatively connected to said second controller indirect enable input and said second controller indirect enable output is operatively connected to said first controller indirect enable input; and
   wherein said second controller produces an indirect enable signal on said second controller indirect enable output when a direct enable signal is received at said second controller direct enable input and a brake command signal is received at said brake command input and produces a driver actuation signal on said second controller driver output when a direct enable signal is present on said second controller direct enable input and an indirect enable signal is present on said second controller indirect enable input and a brake command is received on said second controller brake command input.

7. A braking system comprising:
   a brake control system (BCS) having a first output and a second output;
   a first controller having a brake command input connected to said BCS first output, a direct enable input, an indirect enable input, a driver output and an indirect enable output;
   a second controller having a brake command input connected to said BCS second output, a direct enable input, an indirect enable input, a driver output and an indirect enable output; and
   said first controller producing an indirect enable signal on said first controller indirect enable output when a direct enable signal is received at said first controller direct enable input and a brake command signal is received at said brake command input and producing a driver actuation signal on said first controller driver output when a direct enable signal is present on said first controller direct enable input and an indirect enable signal is present on said first controller indirect enable input and a brake command is received on said first controller brake command input; and
   including a bus connected to a control computer and a direct enable line connecting said bus and said first controller and a second line connecting said bus and said BCS.

8. A braking system comprising:
   a brake control system (BCS) having a first output and a second output;
   a first controller having a brake command input connected to said BCS first output, a direct enable input, an indirect enable input, a driver output and an indirect enable output;
   a second controller having a brake command input connected to said BCS second output, a direct enable input, an indirect enable input, a driver output and an indirect enable output;
   said first controller producing an indirect enable signal on said first controller indirect enable output when a direct enable signal is received at said first controller direct enable input and a brake command signal is received at said brake command input and producing a driver actuation signal on said first controller driver output when a direct enable signal is present on said first controller direct enable input and an indirect enable signal is present on said first controller indirect enable input and a brake command is received on said first controller brake command input wherein said BCS includes a third output and including a third controller having a brake command input connected to the BCS third output, a direct enable input, an indirect enable input, a driver output and an indirect enable output;
   wherein:
   said first controller indirect enable output is connected to said second controller indirect enable input and said third controller indirect enable input;
   said second controller indirect enable output is connected to said first controller indirect enable input and said third controller indirect enable input; and
   said third controller indirect enable output is connected to said first controller indirect enable input and said second controller indirect enable input.

* * * * *